(12) United States Patent
Tanaka

(10) Patent No.: US 6,594,727 B1
(45) Date of Patent: Jul. 15, 2003

(54) ENTERTAINMENT SYSTEM WHICH INCLUDES AN INFORMATION PROCESSING UNIT CAPABLE OF COMMUNICATING WITH DETACHABLE PORTABLE STORAGE DEVICE EVEN AFTER INSERTION OF A DIFFERENT PORTABLE STORAGE DEVICE

(75) Inventor: Makoto Tanaka, Tokyo (JP)

(73) Assignee: Sony Computer Entertainment Inc. (JP)

( * ) Notice: Subject to any disclaimer, the term of this patent is extended or adjusted under 35 U.S.C. 154(b) by 273 days.

(21) Appl. No.: 09/658,176

(22) Filed: Sep. 8, 2000

(30) Foreign Application Priority Data

Sep. 10, 1999 (JP) .............................. 11-258048
Sep. 4, 2000 (JP) ........................ 2000-267054

(51) Int. Cl.[7] .............................. G06F 13/00; G11C 7/00
(52) U.S. Cl. ........................................ 711/115; 365/52
(58) Field of Search ........................... 711/115; 365/52; 235/380, 492

(56) References Cited

U.S. PATENT DOCUMENTS

| | | | | |
|---|---|---|---|---|
| 5,257,388 A | | 10/1993 | Hayamizu .................... 711/115 |
| 5,402,385 A | * | 3/1995 | Ozeki et al. ................... 365/52 |
| 5,636,357 A | * | 6/1997 | Weiner ......................... 711/115 |
| 6,104,430 A | * | 8/2000 | Fukuoka ...................... 348/232 |
| 6,170,743 B1 | * | 1/2001 | Okaue et al. ................ 235/380 |
| 6,336,585 B1 | * | 1/2002 | Harada ......................... 235/380 |

FOREIGN PATENT DOCUMENTS

| | | |
|---|---|---|
| JP | 62-237538 | 10/1987 |
| JP | 2-222028 | 9/1990 |
| JP | 2-286280 | * 11/1990 |
| JP | 3-214384 | 9/1991 |
| JP | 5-012131 | 1/1993 |
| JP | 5-265826 | 10/1993 |
| JP | 6-289958 | 10/1994 |

* cited by examiner

Primary Examiner—Glenn Gossage
(74) Attorney, Agent, or Firm—Lerner, David, Littenberg, Krumholz & Mentlik, LLP

(57) ABSTRACT

A portable storage device is detachably connectable to an information processing unit such that when a file management system is loaded into a main storage device of the portable storage device, a particular value is written to a register, a central processing unit (CPU) checks if the contents of the register coincides with the particular value, the CPU accesses a flash ROM (read only memory) if they are in coincidence, and the CPU re-loads the file management system if they are not in coincidence.

13 Claims, 5 Drawing Sheets

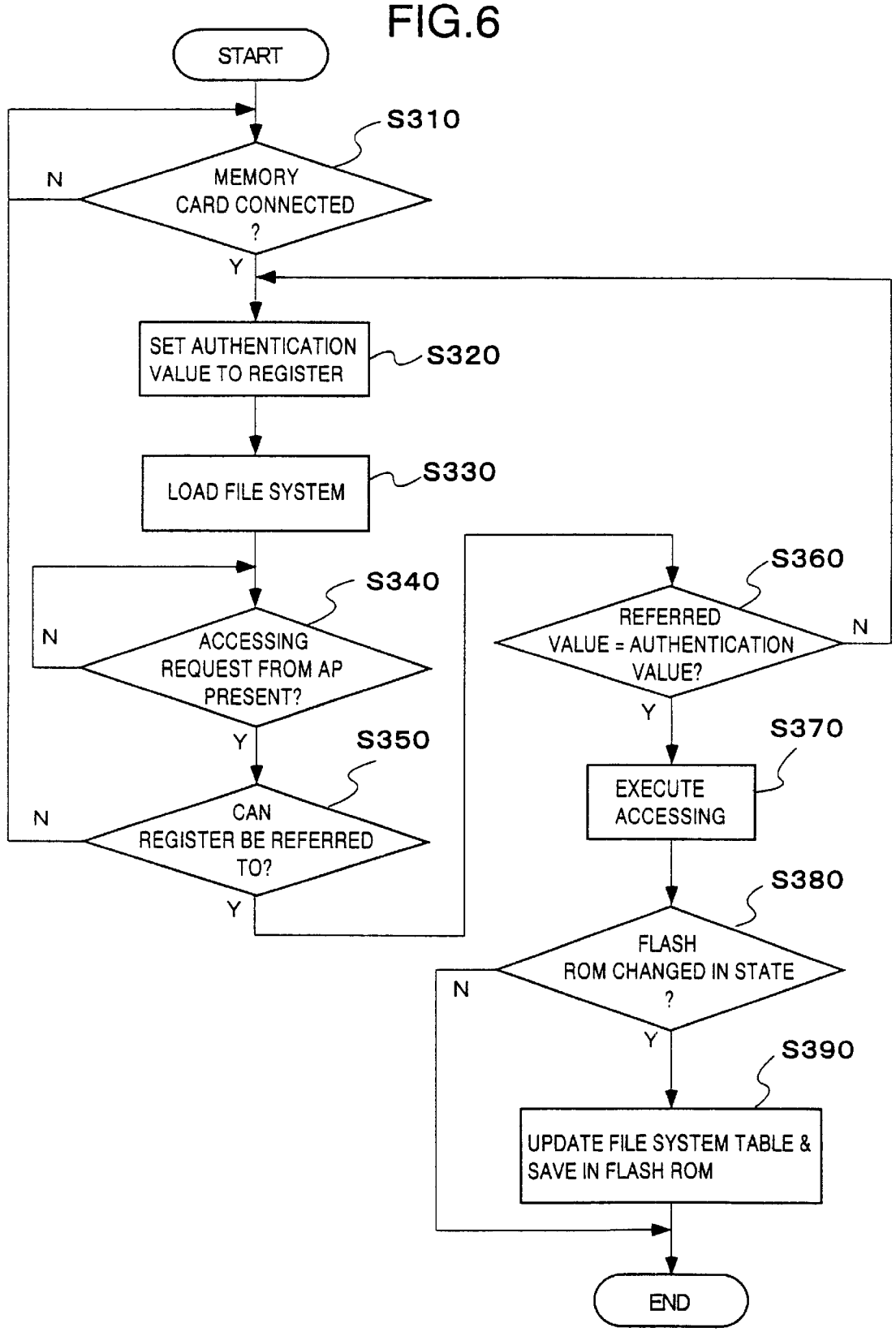

ENTERTAINMENT SYSTEM WHICH INCLUDES AN INFORMATION PROCESSING UNIT CAPABLE OF COMMUNICATING WITH DETACHABLE PORTABLE STORAGE DEVICE EVEN AFTER INSERTION OF A DIFFERENT PORTABLE STORAGE DEVICE

CROSS-REFERENCE TO RELATED APPLICATIONS

This application claims priority based on Japanese Patent Applications No. 11-258048 filed on Sep. 10, 1999 and No. 2000-267054 filed on Sep. 4, 2000, the entire contents of which are incorporated by reference for all purposes.

BACKGROUND OF THE INVENTION

The present invention relates to an entertainment system, an information processing unit used therefor, and a portable storage device detachably mounted to the information processing unit.

In an entertainment system including an information processing unit and a memory card detachably mounted to the unit, the memory card serves as an external storage device for the information processing unit. The memory card includes a flash read only memory (ROM), a control circuit, a clock generating circuit, and a connection terminal. When the memory card is connected to the information processing unit, the memory card communicates with the information processing unit through the connection terminal. The control circuit executes communication control and reading and writing control from/to the flash ROM. The control circuit is formed of a gate array. Power for operating the memory card is supplied from the information processing unit through the connection terminal.

The memory card stores information in the flash ROM on a file basis. In a particular region of the memory card, there is provided a file management system for managing the files. The file management system manages the use condition of the flash ROM such that addresses in the flash ROM and files stored in the flash ROM correspond. The file management system is stored in a particular region on the flash ROM.

The file management system is first loaded onto the memory within the main body of the information processing unit from the flash ROM so that the information processing unit can access the memory card. Then, referring to information in the loaded file management system, an address of a file to be accessed or of an empty region is obtained. When the information processing unit access the flash ROM, the information processing unit directly specifies the address and reading and writing is performed from/to the address. When the information processing unit updates or deletes a file on the flash ROM, the state of the flash ROM changes. At this time, the information processing unit updates the file management system loaded in the memory within the main body of the information processing unit. Then, the contents of the updated file management system are written back to the memory card.

Note, however, that it takes a longer period for the information processing unit to read/write from/to the flash ROM than accessing the memory within the main body of the information processing unit. Therefore, if reading and writing must often be executed from/to the flash ROM, the processing speed of the entire entertainment system itself is lowered. As a result, once the file management system has been loaded into the information processing unit, the file management system is not reloaded unless the state of the flash ROM changes. This prevents the processing speed from unnecessarily being lowered.

SUMMARY OF THE INVENTION

Here, there is a problem associated with insertion/extraction of the memory card. The entertainment system allows the memory card to be inserted/extracted as desired, while the power supply for the information processing unit is on. This is for the convenience of the user. The file management system however is peculiar to each memory card. For example, assume that a file management system is loaded into the memory within the main body of an information processing unit from a memory card, and then the memory card is replaced with another card. The file management system loaded is not a file management system for the inserted memory card. At this time, if the flash ROM of the memory card is accessed based on information in the loaded file management system, the contents of data may be contradictory, or the contents of the flash ROM could be destroyed.

Therefore, the information processing unit must know insertion/extraction of the memory card. One method therefor is to provide a switch at a connector portion of the information processing unit. More specifically, the switch is adapted to output an on/off signal when the memory card is inserted/extracted. If these signals are transmitted to a central processing unit (CPU) by an interrupt, the information processing unit can be informed of the insertion/extraction of the memory card in real time. In this case, however, such a switch must be separately provided. This increases the number of parts, which pushes up the cost.

The CPU may monitor the insertion/extraction of the memory card for every fixed time period. However, the insertion/extraction of the memory card does not occur very often in normal use. Therefore, the time spent by the CPU for monitoring could be mostly wasted. As a result, the processing efficiency of the entire entertainment system is lowered.

It is an object of the present invention to provide: (i) an information processing unit which can be kept informed of the insertion/extraction of a portable storage device without requiring any special parts or special mechanisms, and without increasing the processing load of the information processing unit; and (ii) a portable storage device detachable to the information processing unit.

In order to achieve the above-described object, there is provided an entertainment system according to a first aspect of the present invention which includes a portable storage device, and an information processing unit to which the portable storage device is detachably connectable. The portable storage device includes: a first storage unit whose storage contents are held when the portable storage device is disconnected from the information processing unit; and second storage unit whose storage contents are not held when the portable storage device is disconnected from the information processing unit. The information processing unit includes: means for writing to the second storage unit information indicating that the information processing unit and the portable storage device are connected; and means for referring to the second storage unit and determining whether the referred information coincides with the information written by the means for referring.

According to a second aspect of the present invention there is provided a portable storage device detachable that is detachably connectable information processing unit, the portable storage device including: a first storage unit whose storage contents are held when the portable storage device is disconnected from the information processing unit; a second storage unit whose storage contents are held when the portable storage device is connected to the information processing unit, and the storage contents are not held when the portable storage device is disconnected from the information processing unit; and a control circuit responsive to instructions sent from the information processing unit for controlling reading and writing information from/to the first storage unit and the second storage unit.

According to a third aspect of the present invention, there is provided an information processing unit, to which a portable storage device having a non-volatile storage region and a volatile storage region is detachably connectable, the information processing unit including: means for accessing the non-volatile storage region; means for reading particular information stored in the non-volatile storage region of the portable storage device; means for writing information to the volatile region of the portable storage device when the information processing unit and the portable storage device are connected; and means for referring to the information written to the volatile storage region, for determining whether the referred information coincides with the information by the means for writing and for, instructing the means for reading to re-read the particular information if the referred information and the set information do not coincide.

BRIEF DESCRIPTION OF THE DRAWINGS

FIG. 6 is a diagram illustrating the process of accessing a memory card by an information processing unit according to the present invention.

DETAILED DESCRIPTION

An embodiment of the present invention will be now described in conjunction with the accompanying drawings. In the following description of the embodiment, an information processing unit capable of gaming, reproducing images, reproducing sounds, communication and the like, and a memory card detachably mountable to the information processing unit will be described by way of illustration.

Note that if a game is played in the information processing unit, and the game is interrupted for example,the process of manipulation until the point of interruption is written to the memory card, and stored as data. When the game is resumed, the data about the process of manipulation can be used to resume the game from the point of interruption.

Figure 1:
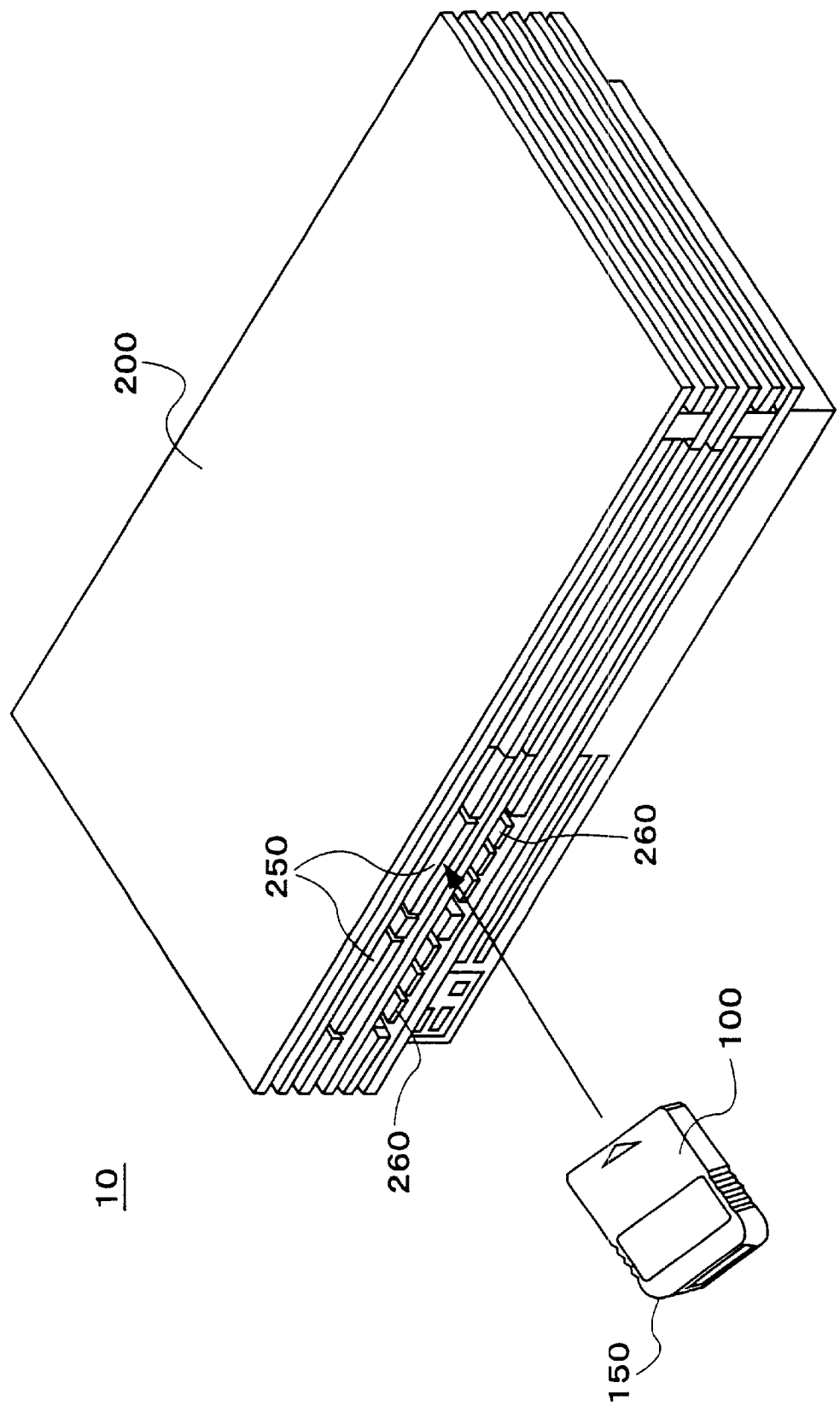
FIG. 1 is an overview of an information processing unit and a memory card according to the present invention.

FIG. 1 is an overview of a memory card 100 and an information processing unit 200 according to the present embodiment. The memory card 100 is inserted to a memory card insertion hole 250 at the fROMt of the information processing unit 200. In addition, a controller and a television (TV) monitor (both not shown) are connected to the information processing unit 200 to form together an entertainment system 10. The controller is connected by inserting a cable and a plug connected thereto (both not shown) to a connector insertion hole 260.

Figure 2:
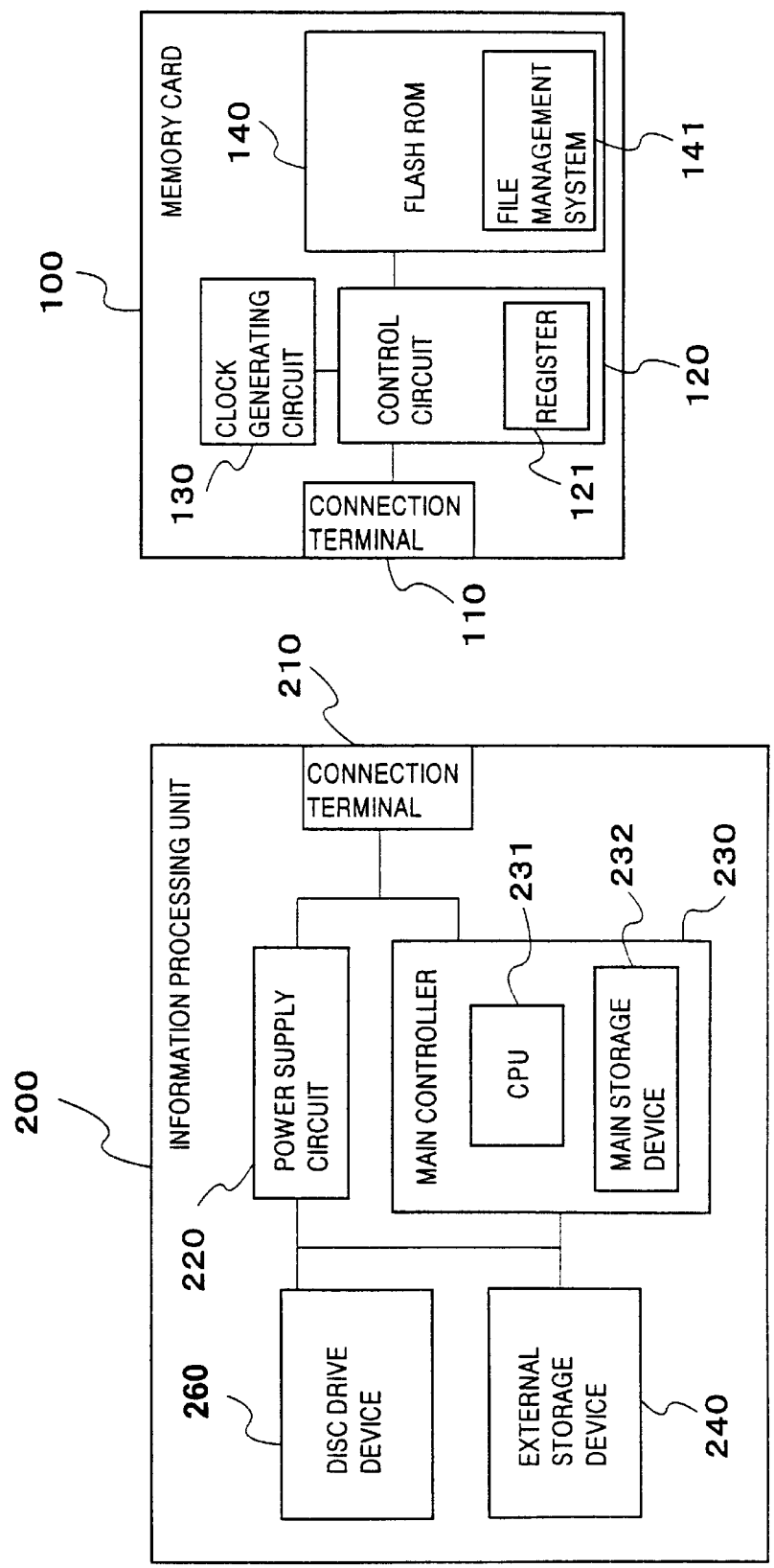
FIG. 2 is a diagram showing a hardware arrangement of an information processing unit and a memory card according to the present invention.

FIG. 2 is a diagram of a hardware arrangement of the memory card 100 and the information processing unit 200 according to the present embodiment.

The memory card 100 includes a connection terminal 110, a control circuit 120, a clock generating circuit 130, a flash ROM 140, and a housing 150 (See FIG. 1) storing these.

The connection terminal 110 comes into contact with a connection terminal 210 of the information processing unit 200 when the memory card 100 is inserted into the memory card insertion hole 250 (See FIG. 1) of the information processing unit 200. As a result, the information processing unit 200 and the memory card 100 are electrically joined.

The control circuit 120 is, for example, formed of a gate array. One gate circuit in the array is used as a register 121. The clock generating circuit 130 generates a clock signal to allow the memory card to operate. Information transmitted from the information processing unit 200 is stored on a file basis in the flash ROM 140 on the memory card 100. The flash ROM 140 is a non-volatile memory, preferably including a plurality of storage regions. A file management system 141 is stored in a particular region of the flash ROM 140. The file management system 141 includes information related to the use of the flash ROM 140, such as information indicating what kind of data are held in the regions of the flash ROM 140. In addition, the file management system 141 stores an address in the flash ROM 140 and the name of a file stored at the address in association with each other.

The memory card 100 does not have a power supply and therefore is supplied with power from the information processing unit 200 through the connection terminal 110. As a result, when the memory card 100 is connected to the information processing unit 200, the power supply is turned on and when the card is extracted, the power supply is turned off. The memory card 100 does not have a power supply back up function. Therefore, when the power supply is turned off, the contents of the control circuit 120 including the register 121 will not be held. In this sense, the control circuit 120 is a volatile storage device. Thus, the contents of the register 121 will be changed.

The information processing unit 200 includes at least the connection terminal 210, a power supply circuit 220, a main controller 230, an external storage device 240 and a disc drive device 260. The main controller 230 includes at least a CPU 231, and a main memory (or storage device) 232.

The power supply circuit 220 supplies power to the information processing unit 200 and the memory card 100.

Figure 3:
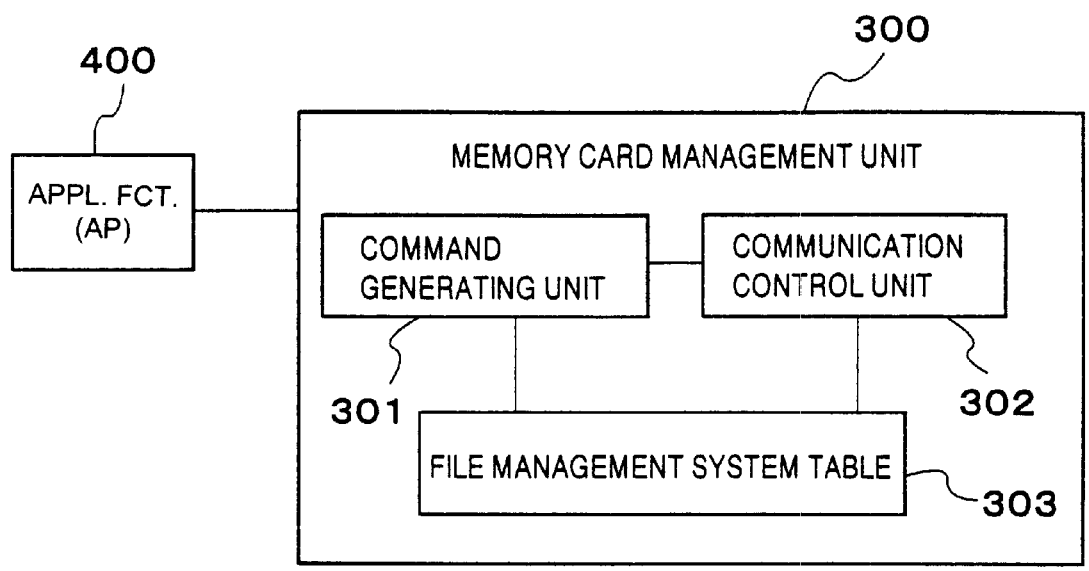
FIG. 3 is a functional block diagram of a main controller in an information processing unit according to the present invention.

The functional block diagram of the main controller 230 is shown in FIG. 3.

The main controller 230 includes at least a memory card management unit 300 which manages the memory card, and an application function (hereinafter referred to as the "AP") 400 implemented by executing an application program. The memory card management unit 300 receives a request from the NP 400 and manages the input/output of the memory card 100. The AP 400 issues a request for reading and writing on a file basis to the memory card management unit 300.

The memory card management unit 300 further includes a command generating unit 301, a communication control unit 302, and a file management system table 303.

The file management system table 303 is formed by loading a file management system 141 of the memory card 100.

The command generating unit 301 receives a request for reading and writing on a file basis from the AP 400 and issues a command to access the memory card. The command generating unit 301 refers to the file management system table 303 as necessary to obtain an address or the like. The communication control unit 302 controls communication with the memory card 100.

Figure 4:
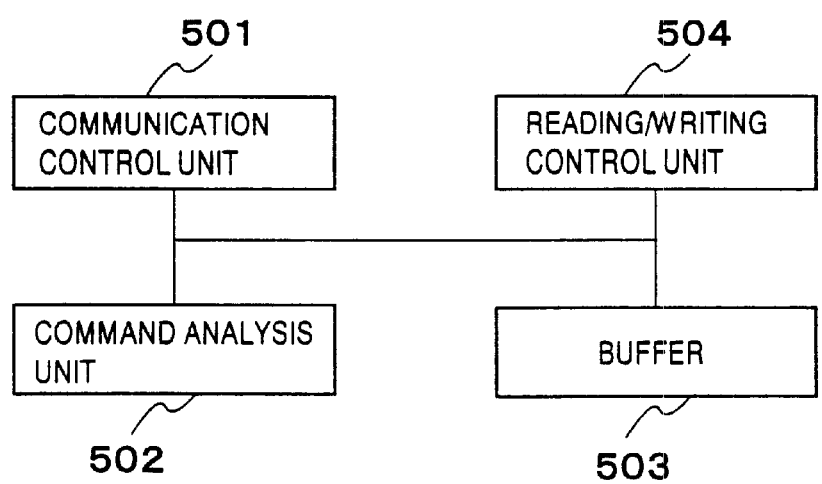
FIG. 4 is a functional block diagram of a control circuit in a portable storage device according to the present invention.

The functional block diagram of the control circuit 120 is given in FIG. 4.

The control circuit 120 includes at least a communication control unit 501, a command analysis unit 502, a buffer 503, and a reading and writing control unit 504.

The communication control unit 501 receives a command from the information processing unit 200 and outputs a result of processing. The command analysis unit 502 analyzes the received command. The command analysis unit 502 then outputs to the reading and writing control unit 504 instructions for reading and writing from/to the flash ROM 140. The command analysis unit 502 writes and refers to the register 121. The buffer 503 temporarily stores the contents of data to be read/written. The reading and writing. control unit 504 controls reading and writing data from/to the flash ROM 140.

According to this embodiment, the control circuit 120 is formed of a gate array. Therefore, the above-described functions are all implemented by hardware logic. However, a memory circuit may be provided with a microcomputer to achieve the functions by software.

An operation of the memory card 100 and the information processing unit 200 as described above will be now described.

When the memory card 100 is inserted into the information processing unit 200, the connection terminals 110 and 210 are coupled with each other. This applies power to the memory card 100. When power is applied to the memory card 100, the control circuit 120 is reset: At this time, the register 121 in the control circuit 120 is also reset. More specifically, the register 121 is set to a prescribed initial value.

Figure 5:
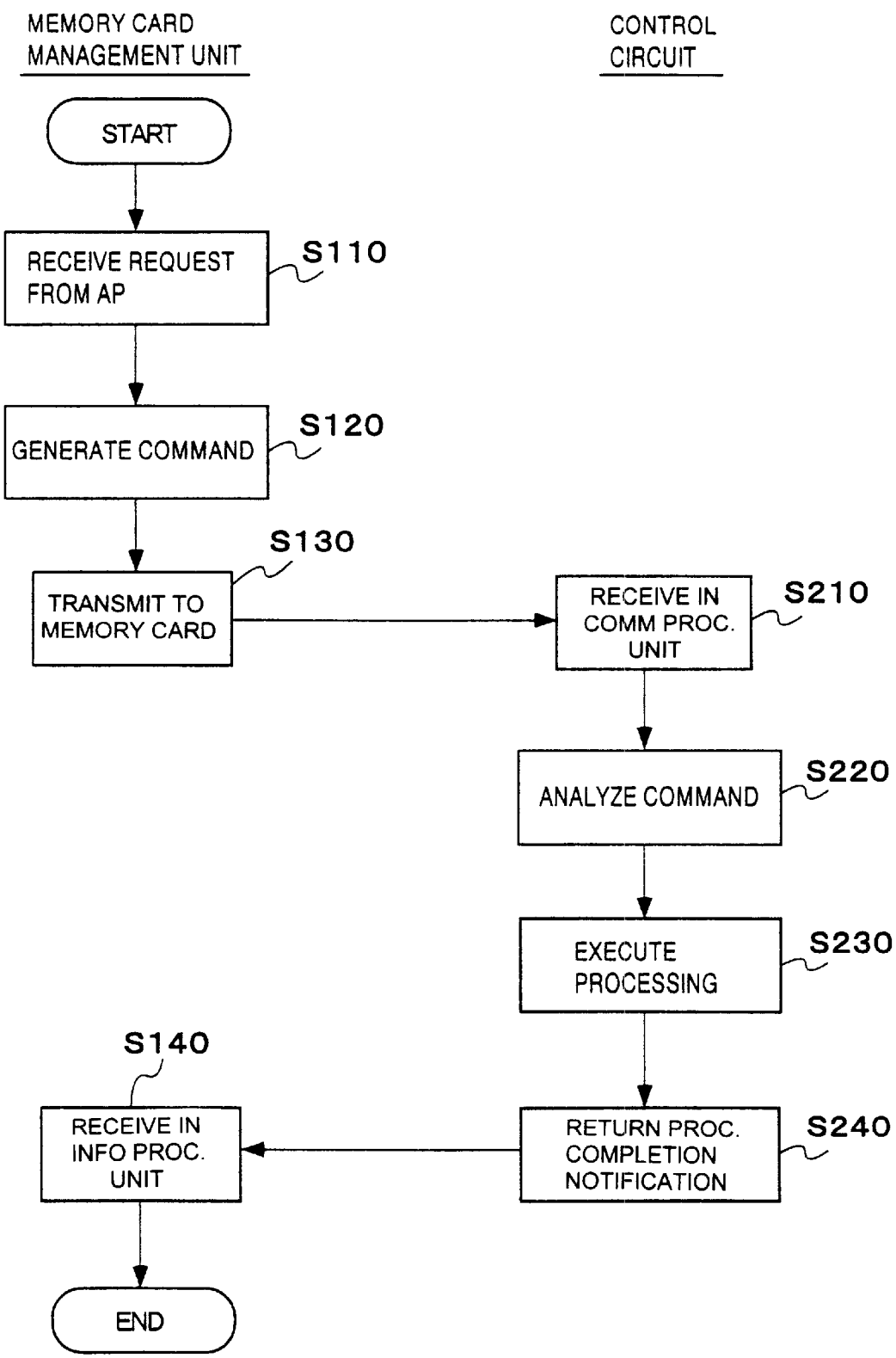
FIG. 5 is a diagram illustrating a method of communication between an information processing unit and a memory card according to the present invention.

A process of generating and analyzing a command will be now described in conjunction with FIG. 5.

The AP 400 issues an access request for writing, reading and erasure or the like to and from the memory card 100. Upon receipt of the request (S110), the command generating unit 301 (See FIG. 3) generates a command to be transmitted to the memory card 100 (S120). At this time, the file management system table 303 is referred to as necessary to obtain an address. The generated command is sent to the memory card 100 through the communication control unit 302 (S130).

In the memory card 100, the command is received by the communication control unit 501 (S210). The contents of the received command are analyzed by the command analysis unit 502 (S220). Based on the result of analysis, the reading and writing control unit 504 executes accumulation of data in the buffer 503 or accessing processing to the flash ROM 140 (5230). After completion of the processing, the communication control unit 501 returns a notification of the completion of the processing (240) which is received by the information processing unit 200 (S140).

The process from issuance of an accessing request to the memory card 100 from the AP 400 to execution of the accessing will be now described in conjunction with FIG. 6. Note that in this processing, the process of generating, analyzing, and executing a command is as described above and therefore a description is not provided.

The information processing unit 200 checks if the memory card 100 is connected (S310). Here, as a method of checking the connection, a reset command is issued, and determination is made based on the presence/absence of a response. However, the connection does not have to be checked by the above method using the reset command. More specifically, an arbitrary command may be issued to the memory card 100, and it may be determined that the memory card 100 is not connected if there is no response in a prescribed time period.

If the connection of the memory card 100 is confirmed, the information processing unit 200 writes to the register 121 an authentication value to establish the identity of the memory card 100 (S320). The authentication value is a particular value different from the initial value.

The information processing unit 200 reads out the file management system 141. The read out file management system 141 is loaded to the file management system table 303 in the information processing unit 200 (S330).

Once the loading processing in S330 has been completed, the memory card management unit 300 will be able to access the memory card 100. The memory card management unit 300 waits for a request from the AP 400 (S340).

When the memory card management unit 300 accepts an access request from the AP 400, the memory card management unit 300 attempts to refer to the contents of the register 121 (S350). If the contents can be referred to, the referred contents and the authentication value set at S320 are compared to determine if they are identical (5360). If they are not identical, it is determined that the memory card 100 whose file management system 141 has been loaded into the information processing unit 200 and the presently connected memory card 100 are different. Then, the processing in S320 and S330 is executed., and the file management system 141 is re-loaded to the file management system table 303.

As described above, if the memory card 100 is extracted from the information processing unit 200, power is removed from the memory card 100. This prevents the contents of the register 121 from being held, and this characteristic is utilized. Furthermore, when the memory card 100 is inserted and power is applied to the memory card 100, the contents of the register 121 are initialized, so that accidental coincidence is not possible.

After the file management system 141 loaded in the file management system table 303 is confirmed as the system of the memory card 100 presently connected, a command is issued to the memory card 100 based on the contents of the file management table 303 to execute accessing (S370).

When the memory card is accessed at 5370, a determination is made as to whether the contents of the flash ROM 140 has been changed (S380). If so, the file management system table 303 is updated and written back to the flash ROM 140 to update the file management system 141 (S390).

In this embodiment, when data in the flash ROM 140 is read out or erased, or data is written into the flash ROM 140, a set of a plurality of commands, or a command set is used. More specifically, both a reading command set and a writing command set include an address setting command to set an address to be accessed, a transmission/reception command to transmit/receive data, and an execution command to instruct accessing execution. An erasing command set includes the address setting command and the executing command. Each of the commands is sent from the information processing unit 200 to the memory card 100.

The address setting command in each command set specifies an address in the flash ROM 140 at which data is to be subjected to reading, writing or erasure.

In the reading command set, the transmission/reception command has data read out from the flash ROM 140 received in the information processing unit 20. In the writing command set, the transmission/reception command transmits data to be written into the memory card to the memory card. The data transmitted to the memory card 100 is temporarily stored in the buffer 503.

The following processings are executed by the execution command.

When it is for the writing command set, data held in buffer 503 (FIG. 4) is written into the flash ROM 140 by the execution command, and the contents of the flash ROM 140 are updated. When it is for the reading command set, data reading from the flash ROM 140 is completed. When it is for erasing command set, data in a prescribed region of the flash ROM 140 is erased. More specifically, a series of processings in reading, writing and erasure are each completed by the execution command.

Here, in the memory card 100 which has accepted the address setting command, once the processing of the address setting command is completed, the memory card 100 issues a completion notification to the information processing unit 200. The information processing unit 200 issues the next command after receiving this completion notification. Therefore, the completion notification is indispensable. So, the completion notification of the address setting command may include the contents of the register 121. Thus, the processing being independently executed at S350 can be included in the address setting command. As a result, the number of communications between the information processing unit 200 and the memory card 100 can be reduced.

If the register cannot be referred to in S350, in S310, the memory card 100 is reset to confirm the connection of the memory card 100.. The resetting is executed before the start of communication between the memory card 100 and the information processing unit 200, and therefore S320 and S330 may be included as a part of the resetting processing.

As described in the foregoing, according to the present embodiment, the insertion/extraction of the memory card can be confirmed using a simple and inexpensive structure without providing a switch at the memory card insertion hole. As a result, the number of parts used for the entertainment system can be reduced, which reduces the cost.

Furthermore, data contradiction or memory card destruction can be prevented without constantly monitoring the insertion/extraction of the memory card.

According to the present invention, an information processing unit can be kept informed of the insertion/extraction of the portable storage device without any special parts or special mechanisms and without increasing the processing load of the entertainment system.

What is claimed is:

1. An entertainment system comprising a portable storage device; and an information processing unit to which said portable storage device is detachably connected, wherein:
    said portable storage device includes a first storage unit whose storage contents are held when said portable storage device is disconnected from said information processing unit; and a second storage unit whose storage contents are not held when said portable storage device is disconnected from said information processing unit,
    said first storage unit has a plurality of storage regions, and holds storage unit information containing storage contents identification information to show what kind of information is held in each of said storage regions, and information related to an address where information specified by said storage contents identification information is stored,
    said information processing unit includes means for writing information to said second storage unit indicating that said information processing unit and said portable storage device are connected;means for referring to said second storage unit and determining whether referred information coincides with said information written by said means for writing; and means for reading said storage unit information when said determination by said means for referring does not indicate a coincidence.

2. An entertainment system according to claim 1, wherein said information processing unit further includes means for initializing said second storage unit by writing an initial value therein when said portable storage device is connected to said information processing unit.

3. An entertainment system according to claim 1, wherein:
    said means for accessing refers to or updates said contents of information stored in said first storage unit based on said storage unit information read by said reading means; and
    said means for referring makes said determination before said means for accessing refers to or updates said contents of information stored in said first storage unit.

4. An entertainment system according to claim 3, wherein said information processing unit further includes means for initializing said second storage unit when said portable storage device is connected to said information processing unit.

5. A portable storage device that is detachably connectable to an information processing unit, said portable storage device comprising:
    a first storage unit whose storage contents are held when said portable storage device is disconnected from said information processing unit, wherein said first storage unit has a plurality of storage regions, and holds storage unit information containing storage contents identification information to show what kind of information is held in each of said storage regions, and information related to an address where information specified by said storage contents identification information is stored;
    a second storage unit whose written storage contents are held when said portable storage unit is connected to said information processing unit, and are not held when said portable storage unit is disconnected from said information processing unit; and
    a control circuit operable to permit said information processing unit to read aid storage unit information from said first storage unit in response to an instruction from said information processing unit indicating that information written into said second storage unit by said information processing unit coincides with other information contained therein.

6. A portable storage device according to claim 5, wherein said first storage unit is non-volatile, and said second storage unit is volatile.

7. A portable storage device according to claim 5, wherein said first storage unit includes a flash ROM, and said second storage unit includes a gate circuit.

8. A protable storage device according to claim 5, wherein:

said second storage unit includes a region for storing information indicating that said information processing unit and said portable storage device are connected; and said control circuit is further operable to set an address within said second storage unit to be read, to execute addressing processing and to notify said information processing unit of contents of said region for storing information of said second storage unit indicating a connection state of said information processing unit and said portable storage device, all in response to an address setting command from said information processing unit.

9. An information processing unit to which a portable storage device having a non-volatile storage region and a volatile storage region is detachably connectable, said information processing unit comprising:

means for reading particular information stored. in said non-volatile storage region of the portable storage device;

means for writing information to establish identity to said volatile storage region of said portable storage device when said information processing unit and said portable storage device are connected; and means for referring to said information stored in said volatile storage region, determining whether said referred information coincides with said information written by said means for writing, and instructing said means for reading to re-read said particular information when said referred information and said written information do not coincide.

10. An information processing unit according to claim 9, further comprising means for initializing said volatile storage region by writing an initial value therein when said portable storage device is connected to said information processing unit.

11. An entertainment system comprising a portage storage device; and an information processing unit to which said portable storage device is attachably and detachably connectable, wherein:

said portable storage device, includes (i) a first storage unit that has a plurality of storage regions, and holds storage unit information containing storage content identification information to show what kind of information is held in each of said storage regions and address-related information containing information specified by said storage contents identification information, said first storage unit holding content stored therein when said portable storage device is disconnected from said information processing unit; and (ii) a second storage unit which does not hold content stored therein when said portable storage unit is disconnected from said information processing unit, and said information processing unit includes (i) means for setting an initial value in said second storage unit when said portable storage device is connected to said information processing unit; (ii) means for overwriting said initial value in said second storage unit with reference information indicating that said information processing unit and said portable storage device are connected, said reference information being different from said initial value; (iii) means for referring to said second storage unit and making a determination whether said second storage unit holds information which coincides with said reference information set by said setting means; and (iv) means for reading said storage unit information from said first storage unit when a result of said determination by said means for referring indicates that said information in said second storage unit does not coincide with said reference information.

12. An entertainment system according to claim 11, further comprising accessing means for referring to or updating information stored in said first storage unit based on said storage unit information read by said reading means, wherein said means for referring makes said determination before said accessing means refers to or updates said information stored in said first storage unit.

13. An information processing unit to which a portable storage device having a non-volatile storage region and a volatile storage region is attachably and detachably connectable, said information processing unit comprising:

means for accessing said non-volatile storage region;

means for setting an initial value in said volatile storage region when said portable storage device is connected to said information processing unit;

means for overwriting said initial value in said volatile region of said portable storage device with identification information when said information processing unit and said portable storage device are connected; and means for referring to said volatile storage region, determining whether said volatile storage region holds information which coincides with said identification information written by said means for overwriting, and instructing said means for accessing to read storage unit information containing storage contents identification information to show what kind of information is held in said non-volatile storage region and address-related information where information specified by said storage contents identification information is stored, when said information held in said volatile storage region and said identification information do not coincide.

* * * * *

UNITED STATES PATENT AND TRADEMARK OFFICE
CERTIFICATE OF CORRECTION

PATENT NO.   : 6,594,727 B1
DATED        : July 15, 2003
INVENTOR(S)  : Makoto

It is certified that error appears in the above-identified patent and that said Letters Patent is hereby corrected as shown below:

Column 1,
Line 51, "access" should read -- accesses --.
Line 53, "writing is" should read -- writing are --.

Column 3,
Line 1, after "connectable", insert -- to the --.

Column 4,
Line 1, "fROMt" should read -- front --.

Column 7,
Lines 10-11, after "card", delete "to the memory card. --.

Column 8,
Line 56, "aid" should read -- said --.

Column 9,
Line 19, delete "." after "stored".

Signed and Sealed this

Fourth Day of November, 2003

JAMES E. ROGAN
*Director of the United States Patent and Trademark Office*